(12) United States Patent
Xu et al.

(10) Patent No.: US 7,685,198 B2
(45) Date of Patent: Mar. 23, 2010

(54) SYSTEMS AND METHODS FOR COLLABORATIVE TAG SUGGESTIONS

(75) Inventors: Zhichen Xu, San Jose, CA (US); Yun Fu, Sunnyvale, CA (US); Jianchang Mao, San Jose, CA (US); Difu Su, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 578 days.

(21) Appl. No.: 11/339,990

(22) Filed: Jan. 25, 2006

(65) Prior Publication Data

US 2007/0174247 A1 Jul. 26, 2007

(51) Int. Cl.
*G06F 7/00* (2006.01)
*G06F 17/30* (2006.01)

(52) U.S. Cl. ................... 707/748; 707/752; 707/754

(58) Field of Classification Search ............ 707/104.1
See application file for complete search history.

(56) References Cited

U.S. PATENT DOCUMENTS

| | | | |
|---|---|---|---|
| 6,732,090 B2 * | 5/2004 | Shanahan et al. | 707/3 |
| 6,778,979 B2 * | 8/2004 | Grefenstette et al. | 707/3 |
| 6,820,075 B2 * | 11/2004 | Shanahan et al. | 707/3 |
| 6,928,425 B2 * | 8/2005 | Grefenstette et al. | 707/2 |
| 7,117,432 B1 * | 10/2006 | Shanahan et al. | 715/512 |
| 7,133,862 B2 * | 11/2006 | Hubert et al. | 707/3 |

* cited by examiner

*Primary Examiner*—Greta L Robinson
*Assistant Examiner*—James J Wilcox
(74) *Attorney, Agent, or Firm*—Seth H. Ostrow; Ostrow Kaufman & Frankl LLP

(57) ABSTRACT

A set of general criteria have been defined to improve the efficacy of a tagging system, and have been applied to present collaborative tag suggestions to a user. The collaborative tag suggestions are based on a goodness measure for tags derived from collective user authorities to combat spam. The goodness measure is iteratively adjusted by a reward-penalty algorithm during tag selection. The collaborative tag suggestions can also incorporate other sources of tags, e.g., content-based auto-generated tags.

13 Claims, 7 Drawing Sheets

SYSTEMS AND METHODS FOR COLLABORATIVE TAG SUGGESTIONS

CROSS REFERENCE TO RELATED APPLICATIONS

This application is related to the following patents and pending applications, each of which is hereby incorporated herein by reference in its entirety:

U.S. patent application Ser. No. 11/082,202, entitled "SEARCH SYSTEM AND METHODS WITH INTEGRATION OF USER ANNOTATIONS FROM A TRUST NETWORK," filed Mar. 15, 2005;

U.S. patent application Ser. No. 11/082,212, entitled "SEARCH SYSTEMS AND METHODS WITH INTEGRATION OF AGGREGATE USER ANNOTATIONS," filed Mar. 15, 2005;

U.S. patent application Ser. No. 11/081,860, entitled "SEARCH SYSTEMS AND METHODS WITH INTEGRATION OF USER ANNOTATIONS," filed Mar. 15, 2005;

U.S. patent application Ser. No. 11/081,871, entitled "SYSTEMS AND METHODS FOR COLLECTING USER ANNOTATIONS," filed Mar. 15, 2005, U.S. Pat. No: 7,599,950; and U.S. Provisional Application No. 60/695,239, entitled "SEARCH ENGINE WITH AUGMENTED RELEVANCE RANKING BY COMMUNITY PARTICIPATION," filed Jun. 18, 2005.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention is directed to selecting and navigating tags associated with a corpus of documents or other content. More specifically, the present invention is directed to systems and methods for suggesting one or more tags for a given document or object.

BACKGROUND OF THE INVENTION

Tagging is a process by which users assign labels in the form of keywords to contents with a purpose to share, discover and recover them. Discovery enables users to find new and interesting objects shared by other users. Recovery enables a user to recall objects that were previously discovered. Recently, an increasing number of tagging services are becoming available on the web, such as the FLICKR(™) Web service, the DEL.ICIO.US(™) Web service, the My Web 2.0 Web service, the RawSugar Web service and the SHADOWS (™) Web service. The FLICKR(™) Web service enables users to tag photos and share them with contacts or make them publicly available. The DEL.ICIO.US(™) Web service allows users to tag uniform resource locators (URLs) and share tagged URLs with the public. The My Web 2.0 web service provides a web-scale social search engine to enable users to find, use, share and expand human knowledge. It allows users to save and tag Web objects, allowing for browsing and searching of objects, as well as sharing Web objects within a personalized community or to the public. Further, the My Web 2.0 Web service provides scoped searches within a user's trusted social network (e.g., friends and friends of friends). As a consequence, the search results are personalized and spam-filtered by trusted networks.

Tagging advocates a grass root approach to form a so-called "folksonomy"which is neither hierarchical nor exclusive. With tagging, a user can enter free form labels to tag any object; it therefore relieves users of much of the burden of fitting objects into a universal ontology. A user may also utilize tag combinations to express interest in contents tagged by other users, e.g., the tags (renewable, energy) for objects tagged by both the keywords renewable and energy.

Those of skill in the art recognize that ontology works well when the corpus is small or in a constrained domain, the objects to be categorized are stable and the users are experts. A universal ontology, however, is difficult and expensive to construct and to maintain when dealing with a large group of users (e.g., hundreds of thousands) with diverse backgrounds. When used to organize Web objects, ontology faces two hard problems: unlike physical objects, digital contents are seldom semantically pure so as to fit in a specific category; and it is difficult to predict the paths through which a user would explore to discover a given object. Taking a directory of Web objects as an example, a recipe book belongs to both the categories shopping and health, since it is hard to predict which category an end user would perceive to be the best fit.

Tagging bridges some gap between browsing and search. Browsing enumerates all objects and finds the desirable one by exerting the recognition aspect of human brain, whereas search exercises the association aspect that dives directly to the interested objects, which is less mentally taxing. The benefits of tagging, however, do not come without a cost. For example, the number of tags tends to multiply at an exorbitant rate. Furthermore, the structure of a traditional hierarchy disappears. Tagging relates to faceted classification, which uses clearly defined, mutually exclusive, and collectively exhaustive aspects to describe objects. For example, a music piece can be identified by facets such as artist, albums, genre, and composer. Faceted systems fail to dictate a linear order in which to experience the facets, a step crucial for guiding users when exploring an information system. Since tags are created by end-users in a free form, the tag collection may lack order and depth when compared to a faceted system constructed by experts. This lack of order and depth can result in a disaster, leaving the users muddled in front of a "hodgepodge."

Therefore, what is need is a system and method that overcome the above-noted short-comings and provide an efficient and effective means for tagging content for sharing, discovery and recovery.

SUMMARY OF THE INVENTION

Systems and methods are provided that utilize collaborative filtering to suggest tags to users, leveraging the collective wisdom of groups of users. System and method of the present invention provide one or more suggested tags having properties that include, but are not limited to, high coverage of multiple facets, high popularity, and least effort. Faceted and generic tags can facilitate the aggregation of contents entered by different users. If the tags are used by a large number of people for a particular object, these tags are likely to be used by a new user for the given object. Least-effort has two meanings. First, the number of objects identified by the suggested tag combination should be small, and second the number of tags for identifying an object should be minimized as well. This enables efficient recovery of the tagged objects.

The collaborative tagging methodologies and/or techniques of the present invention suggest tags for an object based on one or more tags other users utilized to tag the object. This not only addresses vocabulary divergence problems, but also relieves the user of the task of having to come up with good or otherwise favorable sets of tags.

In an embodiment, the collaborative tag suggestions are based on a goodness measure for tags that is derived from collective user authorities. A reward-penalty algorithm iteratively adjusts the goodness measure during tag selection to promote the achievement of the aforementioned properties, including, but not limited to, high coverage of multiple facets, popularity, and least effort.

By introducing the notion of "virtual" users, the tag suggestion methodologies and/or techniques can be extended to incorporate not only user-generated tags but also other sources of tags, such as content-based or context-based auto-generated tags.

BRIEF DESCRIPTION OF THE DRAWINGS

The invention is illustrated in the figures of the accompanying drawings, which are meant to be exemplary and not limiting, in which like references are intended to refer to like or corresponding parts, and in which.

DETAILED DESCRIPTION OF THE INVENTION

In the following description of embodiments of the invention, reference is made to the accompanying drawings that form a part hereof and in which is shown by way of illustration a number of specific embodiments in which the invention may be practiced. It is to be understood that other embodiments may be utilized and structural changes may be made without departing from the scope of the present invention.

Systems and methods are provided to apply a set of general criteria for collaborative tag suggestions. The suggested collaborative tags can be selected by a user to annotate content items found in a corpus of documents (e.g., the World Wide Web). As used herein, the term "annotation" refers generally to any descriptive and/or evaluative metadata related to a Web object (e.g., a Web page or site) that is collected from a user and thereafter stored in association with that user or object. Annotations may include various fields of metadata, such as a rating (which may be favorable or unfavorable) of the document, a list of keywords identifying a topic (or topics) of the document, a free-text description of the document, and/or other fields. An annotation may advantageously be collected from a user of the corpus and stored in association with an identifier of the user who created the annotation and an identifier of the document (or other content item) to which it relates.

Annotations have many applications. For instance, a user viewing a search results page is able to annotate the search results and save the annotations. A user can also create and save an annotation for any page or site visited. Stored annotations can be used in various ways to enhance and personalize search and browsing operations. For example, when the user searches the corpus, any hits corresponding to pages that the user has annotated (referred to herein as "annotated hits") can be highlighted, with a link being provided to allow the user to view the annotation. Where the annotation includes judgment data such as a numerical rating, the annotated hit can be highlighted to indicate whether the user's judgment was favorable or unfavorable. The ratings can also be used for ranking search results in response to the user's queries, with favorable judgments tending to increase the ranking of a given page or site and unfavorable judgments tending to decrease the ranking. Where the annotation includes user-supplied free text and/or descriptive keywords or labels, the user may have the option to search the annotations in addition to or instead of page content. Any time the user visits a page that has been annotated, a control can be provided to allow the user to view and/or edit the annotation.

Figure 1:
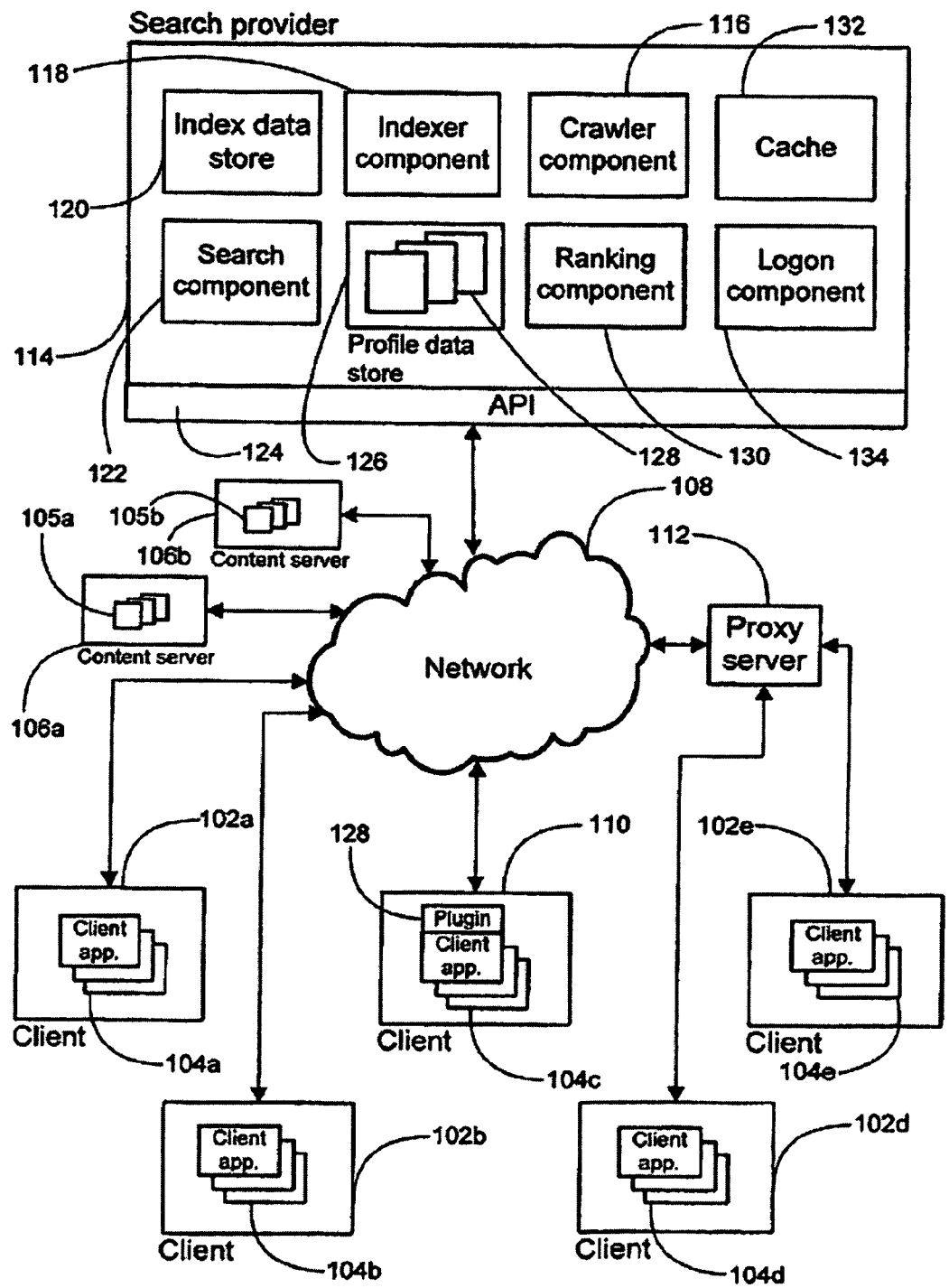
FIG. 1 illustrates an information annotation and distribution system according to an embodiment of the present invention.

FIG. 1 illustrates an embodiment of an information annotation and distribution system 100. System 100 includes a plurality of client devices 102a, 102b, 102c, 102d, 102e, at least one content server 106a and 106b, at least one search provider 114, and a network 108. A proxy server 112 may also be provided. It should be understood that system 100, as described herein, is an exemplary system for implementing various aspects of the present invention. Various modifications and variations can be made without departing from the scope of the present invention. For example, the quantity of system components illustrated in FIG. 1 can be increased or decreased as desired by the system architect. Moreover, the present invention can be implemented in other communication systems that allow a user to search and annotate content, or annotate any type of content, that is made available for sharing, discovery, and/or recovery by the same user or a community of users having access to the content.

Referring to FIG. 1, a user interacts with a client device 102a, 102b, 102c, 102d, 102e. One or more of the client devices 102a, 102b, 102c, 102d, 102e may be a personal computer that includes a processor, transient memory (e.g., RAM), persistent memory (e.g., hard drive), an input device (e.g., mouse, keyboard, touch screen, stylus, voice command interface, or the like), and circuitry to provide communication paths between the components. One or more of the client devices 102a, 102b, 102c, 102d, 102e may also be a desktop computer, notebook computer, computer workstation, personal digital assistant (PDA), cellular device, thin client, or the like.

Each client device 102a, 102b, 102c, 102d, 102e comprises network interface hardware and software that provides the client device 102a, 102b, 102c, 102d, 102e with the ability to transmit and receive data over a network 108. The network 108 provides communication channels between the client devices 102a, 102b, 102c, 102d, 102e, content servers 106a and 106b, search provider 114, and other information sources. Network 108 may be a wired and/or wireless local area network (LAN), virtual LAN (VLAN), wide area network (WAN), and/or metropolitan area network (MAN), such as an organization's intranet, a local internet, the global-based Internet (including the World Wide Web (WWW)), an extranet, a virtual private network (VPN), licensed wireless telecommunications spectrum for digital cell (including CDMA, TDMA, GSM, EDGE, GPRS, CDMA2000, WCDMA FDD and/or TDD or TD-SCDMA technologies), or the like. Network 108 can support wired, wireless, or combinations of both transmission media, including satellite, terrestrial (e.g., fiber optic, copper, UTP, STP, coaxial, hybrid fiber-coaxial (HFC), or the like), radio, free-space optics, microwave, and/or any other form or method of transmission.

A memory device on each client device 102a, 102b, 102c, 102d, 102e, which may be a persistent or transient storage device, provides storage for one or more client applications 104a, 104b, 104c, 104d, 104e. A client device 102a, 102b, 102c, 102d, 102e may run an operating system that provides both a high-level user interface as well as a low-level input/output control and memory management for the client 102a, 102b, 102c, 102d, 102e. Exemplary operating systems include the MICROSOFT WINDOWS XP(™) operating system deployed on some personal computers, and the SYMBIAN OS(™) operating system deployed on some portable cellular devices. Regardless of the operating system, the client devices 102a, 102b, 102c, 102d, 102e maintain an application program 104a, 104b, 104c, 104d, 104e that provides an interface for browsing content made available by one or more content servers 106 a and 106 b. Other examples of application programs 104a, 104b, 104c, 104d, 104e that can be executed on a client device 102a, 102b, 102c, 102d, 102e include, but are not limited to, email applications, instant messaging applications, document management applications, and the like.

The one or more content servers 106a and 106b host files 105a and 105b, which are accessible to clients 102a, 102b, 102c, 102d, 102e over the network 108. A file 105a and 105b may contain one or more items of content, e.g., text, graphics, audio, video, etc. As used herein, the term "file" refers to any item of content that is identifiable by a unique location or address (e.g., a uniform resource locator (URL)). A client 102a, 102b, 102c, 102d, 102e uses a client application 104a, 104b, 104c, 104d, 104e, such as a web browser, to issue a request for a file 105a and 105b to a content server 106a and 106b by providing an address for the file 105a and 105b. The client application 104a, 104b, 104c, 104d, 104e receives the file 105a and 105b that is responsive to the request. The client application 104a, 104b, 104c, 104d, 104e renders the content that is contained in, or pointed to by, the file. For example, where a browser (e.g., client application 104a) running on a client device (e.g., client device 102a) requests a web page (e.g., file 105a) from a web server (e.g., content server 106a), the browser receives the requested page and renders the content comprising the page, which may include links to download and render additional files from other web sites.

Due to the large number of files located on the Internet, it is increasingly difficult to locate files on interest. A search provider 114 provides a mechanism that allows client devices 102a, 102b, 102c, 102d, 102e to search for files 105a and 105b of interest. The search provider 114 comprises an crawler component 116, an indexer component 118, an index data store 120, a search component 122, a ranking component 130, a cache 132, a profile data store 126 to provide persistent storage for one or more user profiles 128, a logon component 134, and an application program interface ("API") 124 that the other search provider components 116, 118, 122, 130, 132 and 134 may use to execute functions for storage, retrieval and manipulation of data in the index data store 120 and profile data store 126. API 124 enables system developers to collect information to assist in the indexing of files, as well as provide techniques for using the information for searching and ranking of result sets that are responsive to user queries. It should be noted that the search provider 114 and its constituent components and data stores may be deployed across the network 108 in a distributed manner whereby key components are duplicated and strategically placed throughout the network 108 for increased performance, e.g., close to the edges of the network.

The search provider 114 comprises a crawler component 116 that is operative to open a communications channel with a content server 106a and 106b over the network 108. The crawler 116 retrieves a file 105a and 105b from the content server 106a and 106b and may store a copy of the file in a cache 132 at the search provider 114. The cache 132 is a persistent storage device. The crawler component 116 may also follow links to other files in the file 105a and 105b, navigating to the linked files and saving a copy of the linked files in the cache 132, and so forth. Preferably, the crawler component 116 retrieves files from a plurality of content servers 106a and 106b in a substantially simultaneous manner so as to collect files 105a and 105b from the greatest number of content servers 106a and 106b in the least amount of time.

In addition to using the crawler component 116 to collect files 105a and 105b from over the network 108, the search provider 114 may also collect information on individual users by monitoring user interaction with client applications 104a, 104b, 104c, 104d, 104e, content servers 106a and 106b, the search provider 114 and other information sources made available over the network 108. The search provider 114 may collect information according to a number of techniques. According to a first technique, a client application 104 c interfaces with a plug-in component 128, e.g., a browser toolbar component that monitors information in the stream of data traffic transmitted and received by the client application 104c. The plug-in 128 may aggregate this information locally on a transient or persistent storage device, which the plug-in 128 periodically transmits to the search provider 114 over the network 108. One embodiment of such a plug-in is the Yahoo! Toolbar browser plug-in for the MICROSOFT INTERNET EXPLORER(™) browser.

Alternatively, or in conjunction with a plug-in 128, a client application 104d and 104e may be in communication with a proxy server 112. Data traffic from the client 102d and 102e passes through the proxy server 112 prior to receipt by the component to which the data is addressed, e.g., content server 106a and 106b. The proxy server 112 may record information from the stream of data traffic transmitted and received by the client application 104d and 104e. The proxy server 112 may further aggregate this information from a plurality of connected clients 102d and 102e and periodically transmit the information to the search provider 114. Where the client application 104a and 104b employs neither a plug-in 128 nor transmits and receives information through a proxy server 112, the search provider 114 may directly collect information from the stream of data that the client application transmits and receives. For example, where the search provider maintains a suitably large collection of files in its cache 132, the user may browse though files from the cache as opposed to browsing the file from its source location, allowing the search provider to observe information in the data stream.

In addition to collecting information from the stream of data that the client application 104a-104e transmits and receives, the search provider 114 may provide advanced functionality that allows a user to perform functions on files 105a-105b that the user browses. The search provider 114 comprises an API 124 that exposes functions for allowing the user to personalize files and the content contained within files, as well as maintain a user's navigation history, which is referred to herein as personalization. Personalization functions that the API 124 provides include, but are not limited to, saving copies of files, tagging files, annotating files, and performing other functions, e.g., highlighting content in a file.

The search provider 114 may also comprise a login subsystem 134 that provides authentication of a user's credentials, thereby providing access to the user's personalized information, which may include a portion of dedicated persistent storage space. Credentials that the user provides to the login subsystem may comprise a username/password pair, a physical token, a biometric identifier, or other identification credentials. According to an embodiment of the invention, the browser plug-in 128 provides client side communication to the API 124. When the user wishes to log into the search provider 114, the plug-in 128 provides the login interface and makes the appropriate calls to the API 124 to authenticate the user.

When the search provider 114 authenticates the user's credentials, the search provider 114 provides the user with access to the functions that the API 124 offers. As the user uses the client application 104*a*, 104*b*, 104*c*, 104*d*, 104*e* to browse files 105*a* and 105*b* that the content servers 106*a* and 106*b* host, function calls may be made to the API 124 to generate personalized information. According to an embodiment of the invention, the API 124 provides a function call that allows a user to save an annotation and associate the annotation with a file at a given address, each annotation, for example, providing the user's thoughts or comments regarding the file or the content contained therein. Similarly, the API 124 may provide a function call that allows a user to save one or more tags and associate the tags with a file at a given address, each tag, for example, providing a descriptive keyword for describing the file or the content contained therein. Another function that the API 124 provides allows a user to save a personal copy of the file or select pieces of content contained therein. Systems and methods for generating personalized information are described in commonly owned U.S. patent application Ser. No. 11/081,860, entitled "SEARCH SYSTEMS AND METHODS WITH INTEGRATION OF USER ANNOTATIONS," filed Mar. 15, 2005, and commonly owned U.S. patent application Ser. No. 11/082, 202, entitled "SEARCH SYSTEM AND METHODS WITH INTEGRATION OF USER ANNOTATIONS FROM A TRUST NETWORK," filed Mar. 15, 2005, the disclosure of which are hereby incorporated by reference in their entirety.

By way of example, assume that the user's client application is the MICROSOFT INTERNET EXPLORER(™) browser configured with the Yahoo! Toolbar plug-in that the user employs to log into a server offering personalized content to the user in addition to search and other functionality, e.g., the My Yahoo! service. Subsequent to logging in, the user employs the web browser to navigate to a given page at a web site, the page identified or addressed by a URL. Because the user has logged into the service provider, the service provider may use this navigation to build an indicia of the user's browsing habits for storage in his or her profile 128. When at the web page, the user may access the personalization function that the service provider API provides, e.g., generating an annotation or tag regarding the page that may be viewed at a later date, which is stored in a user's profile 128. Personalized information in a user profile may be used by the search provider to improve the reliability of the search results that it produces.

Regardless of the specific manner in which the search provider 114 receives information regarding the use of the client application 104*a*-104*e*, the search provider 114 creates a profile 128 for each user of a client application 104*a*-104*e* with which the search provider 114 is in communication, e.g., through a plug-in 128 or proxy server 112, for the storage of personalized information. The search provider 114 generates user profiles 128 that organize and provide the user with access to his or her personalized information, as well as allow the search provider 114 to leverage the personalized information in indexing, searching and ranking search results to enhance relevance.

A number of mechanisms are described herein for collecting personalized information regarding the user including, but not limited to, navigation history, saved documents, tags, annotations, and other information. The search provider 114 stores this information on a per-user basis as one or more profiles 128 in a profile data store 126. According to an embodiment, the profile data store 126 is a relational database whereby each user profile 128 is structured as records located in one or more related data tables. Other data stores are also contemplated as falling within the scope of the present invention including, but not limited to, comma separated value data stores, tab delimited vale data stores, object-oriented databases, hybrid relational-object databases, or the like. The user profiles provide 128 the search provider 114 with a mechanism to retrieve the user's personalized information, such as annotations, tags, saved pages, navigation history, or the like. For example, when the user navigates to a page on which he or she has previously recorded an annotation, the search provider 114 display the user's annotation on a display device in conjunction with the page to which the user navigated.

In addition to the foregoing personalized information that the search provider 114 captures regarding the user for storage in the user's profile 128, the search provider 114 allows the users to create social networks of interrelated users. A social network is a graph wherein each node in the graph represents a user and each edge represents a relationship between two users, such as a friend, colleague, family member, or the like. The degree of separation between a pair of nodes is the minimum number of hops from one node to another. For example, a degree zero node is a given node itself, degree one nodes are those nodes that are directly connected to a given node, degree two nodes are those nodes that have one node between themselves and the given node, etc.

Search provider 114 enables a user to make available the user's personalized information to members of the user's social networks. In addition to storing and making available the user-annotated content to the user and/or authorized members of the user's social network, search provider 114 also includes methodologies and/or techniques for suggesting tag-annotations to a user based on a collaborative assessment of historical tags from the data stores 120. As described in greater detail below, the collaborative tag suggestions are based on a goodness measure for tags that is derived from collective user authorities. A reward-penalty algorithm iteratively adjusts the goodness measure during tag selection.

Figure 2:
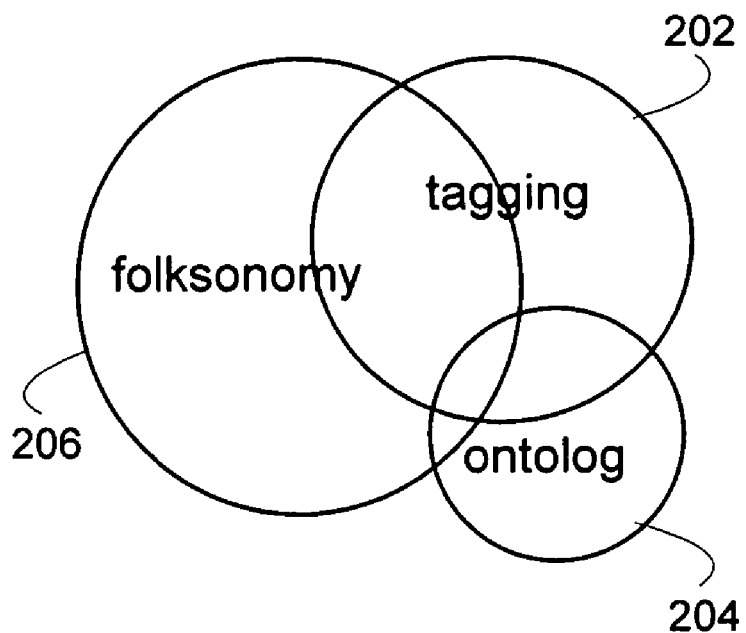
FIG. 2 illustrates tag browsing via filtering according to an embodiment of the present invention.

One way to use tags to browse contents is to treat tags as logical constraints to filter the objects. Refinement of results is done through strengthening the constraints, whereas generalization is done by weakening them. For example, the tag combination (2006, calendar) strengthens tag (2006) and tag (calendar). FIG. 2 illustrates how tags can be used as a filtering mechanism for browsing and searching contents.

The co-occurrence of tags can be explored to enable tag browsing through progressive refinement. When a user selects a tag combination, the system 100 returns the set of objects tagged with the combination. Meanwhile, it also returns the tags that relate to the selected tags, which are those that co-occur with the selected tags. In FIG. 2, the tags tagging 202 and ontology 204 relate to the tag folksonomy 206. Refinement of the current selection can be done by selecting an additional tag, e.g., ontology 204.

According to embodiments of the present invention, a preferable tag combination possesses properties that include, but are not limited to, high coverage of multiple facets, high popularity, least effort, and uniformity or normalization.

First, a preferable tag combination should include multiple facets of the tagged content. For example, tags for a URL to a travel attraction site may include generic tags such as category (travel), location (San Francisco), time (2005), and some more specific tags (Golden Gate Bridge). Generic tags facilitate the aggregation of contents entered by different users and thus are often used for a large number of objects.

Second, a preferable tag combination possesses high popularity. If a set of tags is used by a large number of people for a particular object, these tags are likely to be used by a new user for the given object. This is analogous to the term frequency in traditional information retrieval.

Third, a preferable tag combination is deployable with the least amount of effort. The number of tags for identifying an object should be minimized, and the number of objects identified by a tag combination should be small. As a result, a user can reach any tagged object in a small number of steps via tag browsing.

Finally, a preferable tag combination should promote uniformity or normalization. Since there is no universal ontology, tags can diverge dramatically. Different people can use different terms for the same concept. In general, there exist two general types of divergence: those due to syntactic variance (e.g., blogs, blogging, and blog) and those due to synonym (e.g., cell-phone and mobile-phone), which are different syntactic terms that refer to the same underlying concept.

The present invention also includes techniques and/or methodologies for excluding certain types of tags. For example, organizational tags are less likely to be shared by users with the same intention. Thus, they should be excluded from public usage.

Figure 3:
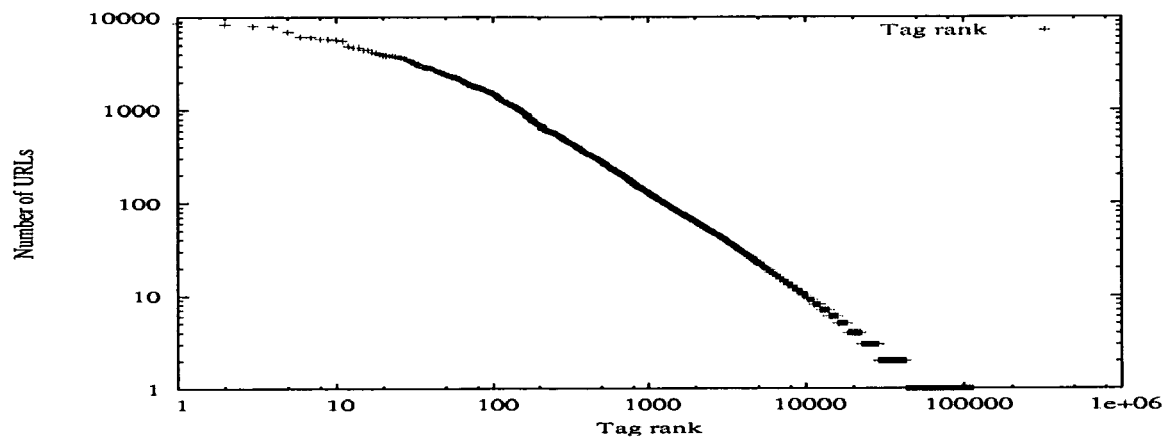
FIG. 3 illustrates a rank of tag versus the number of URLs labeled by a tag, according to an embodiment of the present invention.

According to one embodiment, the above-identified tag properties are based on tag usage illustrated in FIG. 3, which shows the rank of a tag versus the number of URLs labeled by the tag versus the rank of the tag in a log-log scale. Those of skill in the art recognize that the data of FIG. 3 demonstrates a Zipf-like distribution. The data from FIG. 3 shows that users tend to select popular and generic tags to label their interested Web objects, including, but not limited to tags including music, news, software, blog, rss, web, programming, and design. These tags are convenient for users to recover and share with other users.

Figure 4:
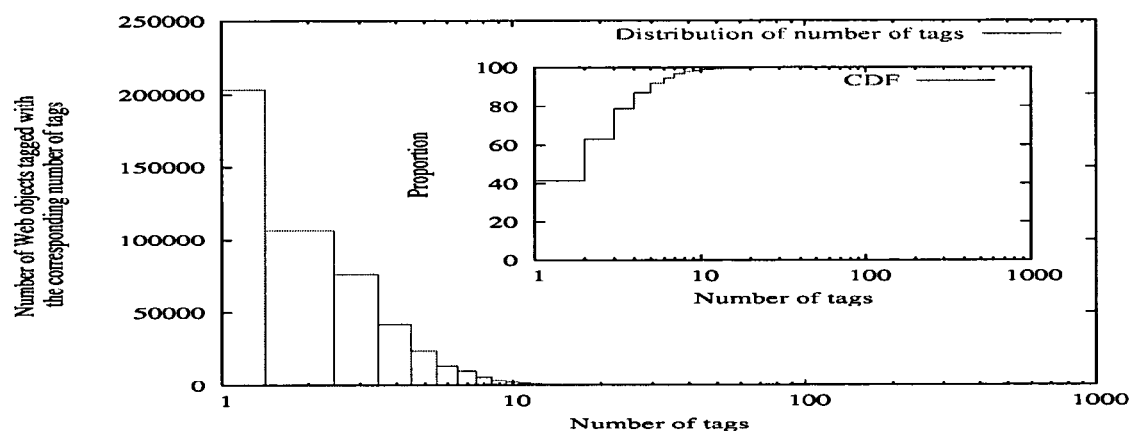
FIG. 4 illustrates a distribution of the number of Web objects tagged with the corresponding number of tags, according to an embodiment of the present invention.

FIG. 4 shows the distribution of the number of tags versus the number of Web objects tagged with the corresponding number of tags. It can be observed that 92% of the Web objects are labeled with equal to or less than five tags, and 79% of the Web objects with equal to or less than three tags. FIG. 4 demonstrates that the least-effort criteria are acceptable to most users.

Figure 5A:
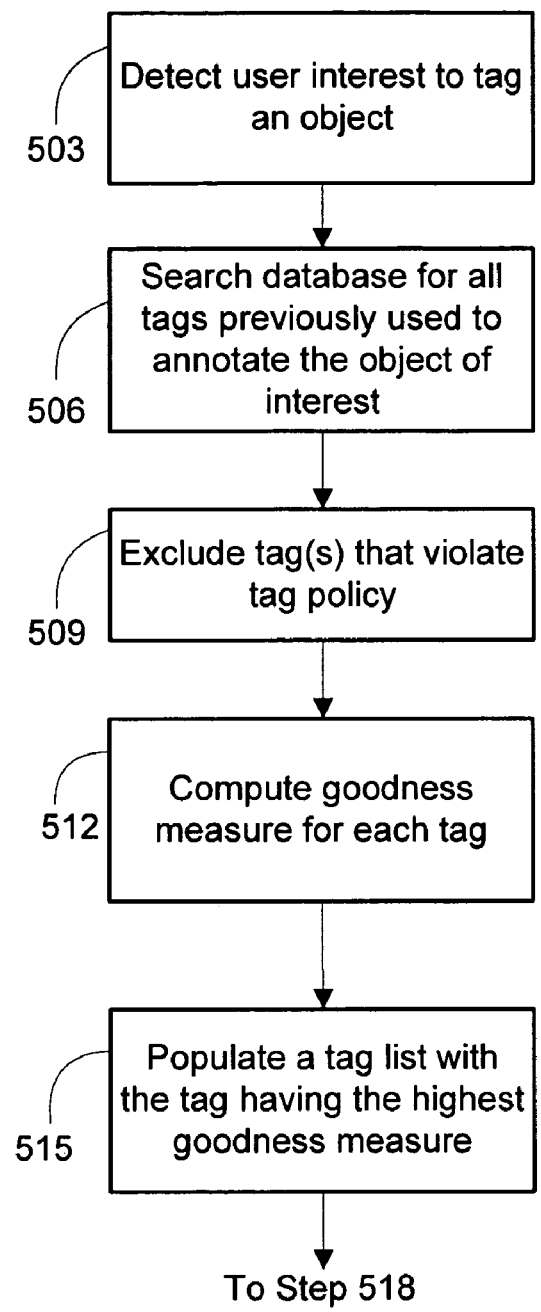
FIGS. 5A-5B illustrate an operational flow for providing collaborative tag suggestions according to an embodiment of the present invention.
Figure 5B:
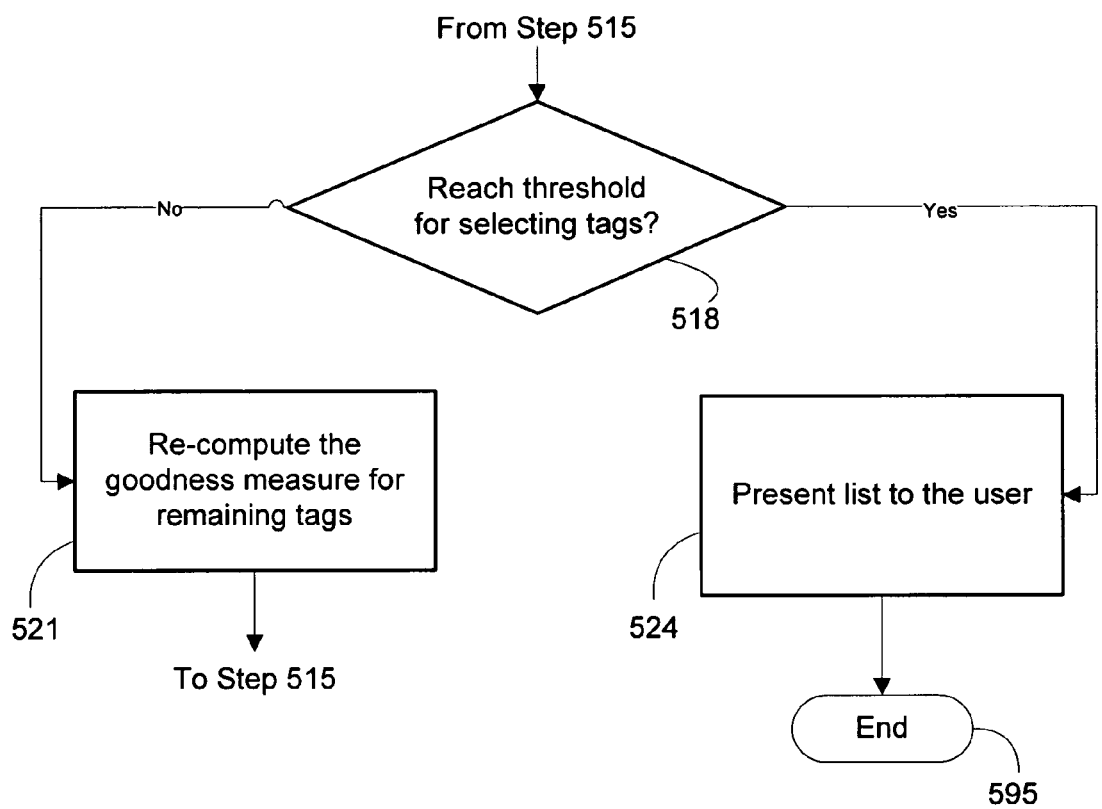

Methodologies and techniques for suggesting tags to a user based on a collaborative assessment of previously provided tags, a goodness measure for tags that is derived from the user authorities for a group of users supplying the tags and a reward-penalty algorithm are discussed herein. Referring to FIGS. 5A and 5B, an example of a general operational flow is described for providing collaborative tag suggestions. More specifically, flowcharts 500A and 500B (referred to collectively herein as flowchart 500) illustrate an exemplary control flow for suggesting tag-annotations to a user based on a collaborative assessment of tags used by users within a social network, which may include users of the information management system outside a given social network.

At step 503, a user expresses an interest to tag an object (e.g., web pages, pictures, music, videos, or other content). The interest can be expressed by logging into an information management system (such as the information annotation and distribution system 100 described above) and sending a request to tag an object. Alternatively, the information management system may automatically predict the user's interest in tagging when the user browses, adds, or edits content stored in the databases of the information management system. The information management system searches its database for tags that have been previously used to annotate the object of interest, step 506. The information management system may exclude tags that violate an established tag policy, step 509. For instance, a tag may be excluded for being offensive, being unlawful, infringing intellectual property rights, violating an organization's usage policy, or the like.

A metric is computed for a tag that provides a goodness measure for the tag, step 512, which may be repeated for all tags for a given object or a subset of tags for a given object. As described above, the properties of a preferable tag combination include high coverage of multiple facets, high popularity, least effort, and uniformity. To that end, the goodness measure is derived from collective user authorities and adjusted by a reward-penalty algorithm. The computation of a goodness measure is described in greater detail below. After computing a goodness measure for the tags, a tag having a goodness measure with a highest value is selected and added to a tag list of collaborative tag suggestions, step 515.

Continuing with FIG. 5B, the size of the list of collaborative tags is evaluated to determine if the list size has reached a threshold value, step 518. The threshold value can be set by the system architect and/or adjusted by the user. For example, the system may be designed to suggest only the top three collaborative tags. The user may reconfigure the system to request more or less tag suggestions on a case-by-case basis. If the threshold value has been reached, step 518, the list is presented to the user, step 524; otherwise, control passes to step 521. For the tags that have not been added to the tag list, the goodness measure is re-computed for each of these remaining tags, step 521. As described in greater detail below, the re-computations are structured to achieve the four criteria for a preferable tag combination.

Following the re-computations at step 521, control returns to step 515 to populate the tag list with the tag having the highest goodness measure. Therefore, steps 515 through 521 are repeated until the threshold is reached at step 518, and control passes to step 524. The list of collaborative tag suggestions is presented to the user, step 524. Upon presentation of the tag list, the control flow ends as indicated at step 595. Because tags introduced are often time sensitive (due to recent events such as the hurricane Katrina, shifting user interests, or announcements of new products) a higher weight may be given to the goodness score for more recent tags than those introduced a long time ago.

According to embodiments of the invention, the use may input a tag through the use of a user interface control, e.g., a command line prompt or a graphical text input control. When the user attempts to input a tag for a given document, an auto-complete function may utilize the list of collaborative tag suggestions to complete the input of the tag. The selection of tags for auto-completion may be selected according to a tags authored by the user, which may further be sorted according to varying combinations of metrics including, but not limited to, tag origination (date and time), the tag frequency, and the authority score for users. The selection of tags for auto-completion may also include the remaining tags from the list of collaborative tag suggestions that originate from other users, including virtual users. According to another embodiment, the tags selected and sorted for auto-completion is presented using other text selection or entry controls, e.g., presentation of the tags using in a drop down menu.

In an embodiment of the present invention, the computations and re-computations for the goodness measure is based on the following variables: an authority score "a(u)," a probability function associated with the same user "$P_s(t_i|t_j;o)$," a probability function associated with all users "$P_a(t_i|t_j)$," and a goodness measure "VC(t, o), where u denotes a user, o denotes an object, and t, $t_i$, and $t_j$ are tags."

The first variable is the authority score "a(u)." The authority score (also referred to as a "reputation score") is computed for system users. The authority score measures how well each user has tagged in the past, which may be modeled as a voting problem. When a given user votes consistent with the majority of other users, the given user gets a higher authority score; the user gets a lower score with more bad votes. The authority score is, therefore, useful in helping to combat tag spam.

The authority score of a given user can be computed as follows:

$$a(u) = \frac{\sum_{o \in object(u)} \frac{\sum_{t \in tag(o,u)} VC(t, o)}{\sum_{t' \in tag(o,*)} VC(t', o)}}{|object(u)|}$$ Equation (1)

$$VC(t, o) = \sum_{u \in user(t,o)} a(u)$$ Equation (2)

According to Equations 1 and 2, "t" represents a specific tag for a given object o, "t'" represents the remaining tags for object o, "a(u)" represents the authority score of a given user u; "user(t,o)" represents the set of users who have tagged object o with tag t; "object(u)" represents the set of objects tagged by a given user u; "tag(o,u)" represents the set of tags assigned to object o by user u; and object(u) represents the total number of objects that user u has tagged.

The authority score for a given user may be an initial value (e.g., 1.0), and adjusted during subsequent calculations. If a tagging application allows users to rate other users or tagged objects, as is the case in many open rating systems, the authority score from such open rating systems may be incorporated into the collaborative tag suggestion algorithm of the present invention. Therefore, the authority score may be initially set a value obtained from an open rating system.

The second variable is the probability metric $P_s(t_i|t_j;o)$, which represents the probability that any object is tagged with $t_i$, given it is already tagged with $t_j$ by the same user.

The probability metric $P_a(t_i|t_j)$ represents the probability that any object is to be tagged with tag $t_i$, given it is already tagged with tag $t_j$ by any users. In this case, the tags assigned to the object by users are aggregated. This probability measures the overlap between the concept that is identified by $t_i$ and $t_j$. The overlap of the concepts identified by the suggested tags may be minimized to ensure that the suggested tags cover multiple facets.

The variable VC(t, o) represents the goodness measure of tag t to object o. Referring to Equation 2, the goodness measure is based on the sum of the authority score values for all users who have assigned tag t to the object o. As discussed, the authority score may initially be set to 1.0 for every user. As such, the goodness measure initially is the total number of users who have tagged the object with the tag. In an embodiment, the goodness measure can be enhanced by multiplying the value by the inverse of the coverage of tag, which is the number of different objects tagged by t with some dampening applied. The wider the coverage, the less specific the tag is to a given object. This is analogous to term frequency-inverse document frequency (TF*IDF) weight used in traditional information retrieval.

As described with reference to FIGS. 5A and 5B, a list of collaborative tag suggestions is created by iteratively selecting the tags with the highest additional contribution measured by VC(t,o) to the already selected tag set. VC(t,o) is initialized to the sum of the authority scores (of all users who have assigned tag t to object o) multiplied by a dampened coverage score of t. At each step, after a tag $t_i$ is selected, the VC score is adjusted for each remaining tag t' by a penalty-reward algorithm. First, remaining tag t' is penalized by removing the redundant information, e.g., by subtracting "$P_a(t'|t_i)*VC(t_i;o)$" from VC(t',o), which may be accomplished according to the following equation:

$$VC(t',o)=VC(t',o)-P_a(t'|t_i)*VC(t_i;o)$$ Equation (3)

Equation (3) minimizes the overlap of the concepts identified by the suggested tags. Second, the remaining tag t' is rewarded if it co-occurs with the selected tag $t_i$ when tagged by the same user. Rewarding may be implemented according to the following equation:

$$VC(t',o)=VC(t',o)+P_s(t'|t_i;o)*VC(t_i;o)$$ Equation (4)

Since, a single user is not likely to tag a given URL using tags that are syntactic variances, e.g., blogs, blogging, blog, this rewarding mechanism also improves the uniformity of the suggested tags.

The goodness measure computations are designed to ensure that the suggested tag combination has a good balance between coverage and popularity. A representative example of pseudo code that may be used to compute the goodness according to one embodiment of the invention measure is provided as follows:

```
R = { }; // result tag set
T = all the tags assigned to object o by all users;
X = a set of excluded tags
K = pre-specified maximum number of suggested tags;
T = T - X;
Compute VC(t,o) for each t in T;
While (T ≠ empty AND |R| < K) {
    //find the tag with the highest additional contribution
    t_i ∈ T AND VC(t_i,o) ≧ VC(t_j,o) for t_j ∈ T AND j ≠ i
    //remove the chosen tag from T
    T = T - {t_i};
    //adjust the additional contribution of the remaining tags
    foreach tag t' ∈ T {
        VC(t',o) = VC(t',o) -
        P_a(t'|t_i)*VC(t_i;o) +
        P_s(t'|t_i;o)*VC(t_i;o);
    }
    //record the chosen tag
    R = R ∪ {t_i};
}
```

T is the set of tags assigned to a given object by all users. The pseudo code program suggests a pre-specified number of K tags to users based on the tags in T. The suggested tags are stored in the set of tags R. It should be noted by those of skill in the art that the pseudo code adopts a greedy approach to penalize and reward the tag score. In another embodiment, a Bayesian network of the probabilities may be employed.

In an embodiment, the values for the authority score a(u) and goodness measure VC(t, o) are recalculated using an iterative process during the analysis of each tag for possible selection. In another embodiment, the authority score and goodness measure computations are recalculated until a pre-specified tolerance level has been reached. Afterwards, the authority score is held constant for each goodness measure computation.

Figure 6:
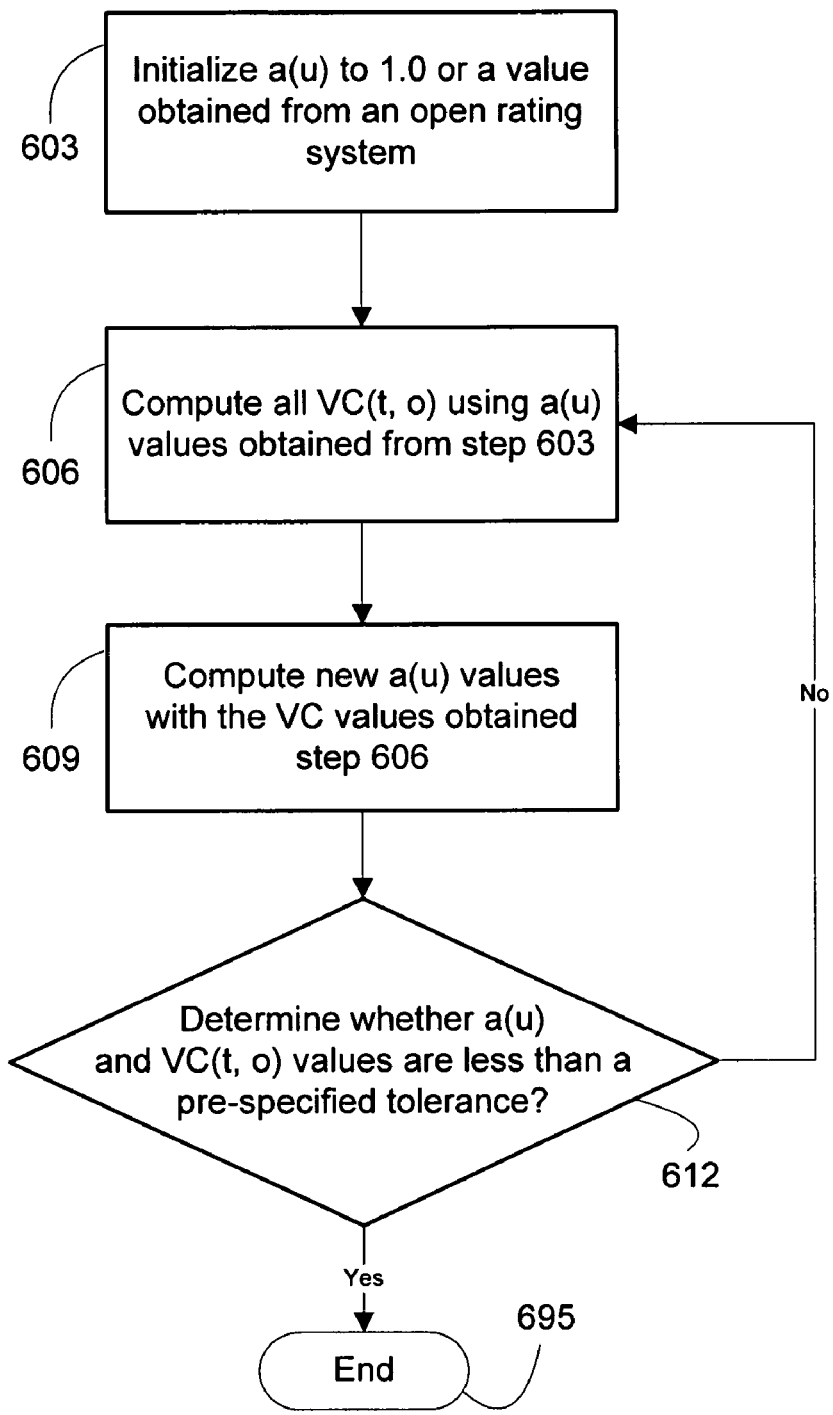
FIG. 6 illustrates an operational flow for initializing and establishing an authority score value according to an embodiment of the present invention.

Referring to FIG. 6, flowchart 600 illustrates a general operational flow for initializing and establishing an authority score value. The control flow begins with the authority score set to the same value (such as 1.0) for all users, a value obtained from an open rating system, or other initial value. Thereafter, the goodness measure VC(t, o) for all tags for a selected object are determined from the initial authority score a(u) values, step 606. New values for the authority scores are computed from the more recently computed goodness measures, step 609. The computations at steps 606 and 609 are repeated until the changes in the authority score and goodness measure values are less than a tolerance, step 612, which may be specified in advance. Afterwards, the control flow ends at step 695, and the authority score values are held constant with subsequent goodness measure values based on the constant values for the authority score.

In addition to using tags entered by the real end-users as a source for tag suggestions, content-based and context-based tags can be suggested that are based on analysis and classification of the tagged content and context. This not only solves the cold start problem, but also increases the tag quality of those contents that are less popular.

In an embodiment, auto-generated tags are incorporated by introducing a virtual user and assigning an authority score to this user. The auto-generated tags may then be attributed to this virtual user. The goodness measure is thereafter computed and re-computed as described above. Tag suggestions via a virtual user allow multiple sources of tag suggestions to be incorporated under the same framework.

In conjunction with the foregoing, collapsing syntactic variance of the same term can fit in the algorithmic framework described herein. For instance, the bi-gram of individual tags in the currently chosen tag set can be computed. This set may be denoted "C." To adjust the additional contribution of a remaining tag, a set of bi-grams of remaining tags are computed. This set may be denoted "S." The additional contribution of the tag can be computed by multiplying its current value with the following factor, 1−|S∩C|/|S|. Other techniques for improving tag uniformity include stemming, edit distance, thesauri, and similar techniques known to those of skill in the art.

FIGS. 1 through 6 are conceptual illustrations allowing an explanation of the present invention. It should be understood that various aspects of the embodiments of the present invention could be implemented in hardware, firmware, software, or a combination thereof. In such an embodiment, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We Claim:

1. A computerized method of presenting collaborative tag suggestions to a user in communications with a content annotation and distribution system, the method comprising:

accessing a request from the user to annotate a content item with a tag found in a corpus of documents;

collecting a plurality of tags associated with the content item by a plurality of users having access to the corpus of documents;

computing a goodness measure based on a sum of authority scores for each of the plurality of tags, the goodness measure is a value indicating authoritativeness of the tags, wherein an authority score is a score representative of the one or more ratings assigned by one or more secondary users to a user that has submitted a tag for an object, the authority score capable of being adjusted based on a reward/penalty system;

enhancing the goodness measure by applying an inverse frequency weight, adjusting the goodness measure to account for user authority, incrementing the goodness measure to improve tag coverage and uniformity, decrementing the goodness measure to remove redundant information;

populating a tag list with a tag having with the highest goodness measure; and presenting the tag list to the user.

2. The method of claim 1, further comprising:
re-computing the goodness measure for the remaining tags not included in the tag list.

3. The method of claim 2, further comprising:
repeating said populating and said re-computing until the tag list reaches a threshold.

4. The method of claim 1, wherein said collecting comprises:
excluding one or more tags that violate a tag policy, wherein the tag policy comprises one or more set of rules to be applied to the plurality of tags.

5. The method of claim 1, wherein said collecting comprises:
introducing a virtual user for a tag source;
attributing, to the virtual user, one or more auto-generated tags from the tag source; and
including the one or more auto-generated tags with the plurality of tags.

6. The method of claim 5, wherein the one or more auto-generated tags include a tag based on content categorization.

7. The method of claim 1 comprising:
receiving user input for an annotations of an object with a tag; and
completing the user input through the use of the tag list.

8. A computerized method of ranking a suggested tag, the method comprising:
determining an authority score for each user that has submitted a tag for an object of interest, wherein the authority score is a score representative of the one or more ratings assigned by one or more secondary users to a user that has submitted a tag for an object;
producing, for the suggested tag, a sum of authority scores computed during said determining;
adjusting the sum to account for at least one of multiple facets, popularity, least effort, or uniformity; and
associating the adjusted sum to the suggested tag.

9. The method of claim 8, wherein said adjusting comprises:
incrementing the goodness measure to improve tag coverage and uniformity.

10. The method of claim 8, wherein said adjusting comprises:
decrementing the goodness measure to remove redundant information.

11. A computer program product having computer readable program code functions embedded on a physical storage device for causing a computer to present collaborative tag suggestions to a user in communications with a content annotation and distribution system, comprising:

a first computer readable program code function that causes the computer to access a request from the user to annotate a content item with a tag found in a corpus of documents;

a second computer readable program code function that causes the computer to compute a goodness measure that is based on a sum of authority scores for each of a plurality of tags associated with the content item by a plurality of users, the goodness measure is a value indicating authoritativeness of the tags, wherein an authority score is a score representative of the one or more ratings assigned by one or more secondary users to a user that has submitted a tag for an object, the authority score capable of being adjusted based on a reward/penalty system;

a third computer readable program code function that causes the computer to enhance the goodness measure by applying an inverse frequency weight, adjusting the goodness measure to account for user authority, incrementing the goodness measure to improve tag coverage and uniformity, decrementing the goodness measure to remove redundant information;

a fourth computer readable program code function that causes the computer to populate a tag list with a tag having with the highest goodness measure; and a fifth computer readable program code function that causes the computer to present the tag list the user.

12. The computer program product according to claim 11, further comprising:
a sixth computer readable program code function that causes the computer to re-compute the goodness measure for the remaining tags not included in the tag list.

13. The computer program product according to claim 12, further comprising:
a seventh computer readable program code function that causes the computer to repeat execution of said fourth computer readable program code function and said sixth computer readable program code function until the tag list reaches a threshold.

* * * * *